United States Patent [19]
Wang et al.

[11] Patent Number: 5,933,147
[45] Date of Patent: Aug. 3, 1999

[54] COMPUTER GRAPHICS MEMORY ARCHITECTURE WHICH PROCESSES A FULL PIXEL OF 3D COLOR AND Z VALUE DATA IN A SINGLE I/O TRANSACTION

[75] Inventors: Bao-Tyan Wang, Kaushiung; Wei-Kuo Chia, Hsinchu; Jin-Han Hsiao, Chupei, all of Taiwan

[73] Assignee: Industrial Technology Research Institute, Hsinchu, Taiwan

[21] Appl. No.: 08/531,600

[22] Filed: Sep. 21, 1995

[51] Int. Cl.[6] .................................................. G06T 15/00
[52] U.S. Cl. ............................................................ 345/422
[58] Field of Search .................... 395/119–122, 515–518; 345/419–422, 515–518

[56] References Cited

U.S. PATENT DOCUMENTS

| | | | |
|---|---|---|---|
| 5,046,023 | 9/1991 | Katsura et al. | 345/434 |
| 5,185,856 | 2/1993 | Alcorn et al. | 345/430 |
| 5,502,505 | 3/1996 | Nakata et al. | 395/122 X |

*Primary Examiner*—Almis R. Jankus
*Attorney, Agent, or Firm*—Meltzer, Lippe, Goldstein, et al.

[57] ABSTRACT

An improved computer graphics memory architecture has a frame buffer and a Z buffer, each having a forward and reverse part, each of which is wide enough to handle two pixels of data. A data path is connected to the buffers so that in a 3-D application, a full pixel of both color and Z-value data is transported along the data path in a single I/O transaction. In a 2-D application, two pixels of data are transported along the data path in a single I/O transaction. In a preferred embodiment, both the frame and Z buffers are divided into two parts each wide enough to handle one pixel of data part. In 3-D applications, a data path is selectively connected to the buffers in a manner so that one pixel of color data and one pixel of Z-value data are simultaneously transported to the drawing processor during each I/O transaction. In this preferred embodiment, a first reversing switch such as a multiplexer circuit, is provided to reverse data that arrives from the buffer in reverse order. A second reversing switch, such as a multiplexer circuit, is provided to return the data to the proper buffer after processing. In a preferred embodiment for 2-D applications, two pixels of data are transported to the drawing processor each I/O transaction. In this preferred embodiment, a third reversing switch is provided to reverse data that arrives from the buffer in reverse order. A fourth reversing switch is provided to return the data to the proper buffer after processing.

20 Claims, 3 Drawing Sheets

5,933,147

1

COMPUTER GRAPHICS MEMORY ARCHITECTURE WHICH PROCESSES A FULL PIXEL OF 3D COLOR AND Z VALUE DATA IN A SINGLE I/O TRANSACTION

FIELD OF THE INVENTION

The present invention relates to graphical user interface engines for use with a computer. In particular, the present invention relates to an improved computer graphics memory architecture for use with a graphical user interface that is fast, yet uses hardware in an efficient and economical manner.

BACKGROUND OF THE INVENTION

Computer graphics applications are becoming increasingly complex. The large amount of data a computer processes when running a program having complex graphics slows down the computer. Computer graphics software cannot reduce the amount of data to be processed, and therefore cannot solve the problem of speeding up the graphics processing problem. Thus, some computer engineers have improved computer graphics memory architectures to improve graphics processing speed.

FIG. 1 depicts a conventional computer system 10. The computer system 10 has a processor 12 comprising of one or more CPUs, a main memory 14, a disk memory 16, and an input device 18, such as a keyboard and mouse. These devices 12–18 are connected to a bus 20 which transfers data, i.e., instructions and information, between the devices 12–18. A graphics controller 30 is also connected to the bus 20. As shown, the graphics controller 30 includes a drawing processor 32. The drawing processor 32 is also connected to an address generator 36 and a data input of a frame buffer 34 and a Z buffer 35. The address generator 36, in turn, is connected to RAS (row address select) (not shown), CAS (column address select) (not shown), and chip select inputs (not shown) of the frame buffer 34 and Z buffer 35. Illustratively, the frame and Z buffers 34, 35 are implemented with plural VRAMs (video random access memories). The frame buffer 34 is connected to a display device 38, such as a cathode ray tube (CRT) or liquid crystal display (LCD) monitor.

The drawing processor 32 receives instructions from the processor 12 for drawing objects. For instance, in the case of a computer aided design (CAD) application, the processor 12 may receive user input regarding creating and locating objects in three dimensional (3-D) space. The processor 12, in turn, transfers instructions regarding the size, location, texture, translucence, etc. of such objects to the drawing processor 32. In response, the drawing processor 32 creates a pixel image representation of a plane of view of such objects in 3-D space. The pixels of the image of each plane of view form part of a frame that is stored by the drawing processor 32 in the frame buffer 34. In 3-D graphics applications, each pixel has color data (e.g., data for the red, green, and blue values of the pixel), and so called Z-values, relating to the Z-coordinate, or depth, of a graphical image. The pixel color data is stored in the frame buffer 34. The pixel Z-values are stored in the Z buffer 35. In two dimensional (2-D) applications, the Z-buffer 35 may be used as an additional frame buffer to hold pixel color data. Drawing processors 32 are known, such as is disclosed in U.S. Pat. Nos. 5,046,023 and 5,185,856. The latter reference discloses a drawing processor that is specifically adapted for rendering 3-D objects. The contents of these patents are incorporated herein by reference.

2

FIG. 2 is a block diagram of one type of known computer graphics memory architecture. The architecture comprises a drawing processor 32', a frame buffer 34, a Z buffer 35, and a data path 40. The drawing processor 32' comprises a 3-D processing unit 42' and a 2-D processing unit 44'. The 3-D processing unit has a pixel color processor C and a pixel Z-value processor Z. All of these hardware elements are well known to those skilled in the art. This hardware is disclosed, for example, in the patents discussed above.

In a 3-D application, the frame buffer 34 holds color data for a number of pixels, each pixel having 32 bits of color data. In the architecture of FIG. 2, the frame buffer 34 is 64 bits wide and is connected to a 64 line data path 40. The data path 40 can handle two pixels of color data simultaneously when data is transported from the buffers to the drawing processor or returned to the buffers after processing. The Z buffer 35 holds Z-value data for a number of pixels, each pixel having 24 bits of Z-value data. The Z buffer is 64 bits wide and is also connected to a 64 line data path 40. The 16 bit difference between the number of Z bits and the available data lines cannot be avoided because the data path 40 is 64 lines. In any event, these 16 data lines are used when the Z buffer 35 is used as an additional frame buffer during 2-D applications discussed below. Thus, the data path 40 can handle two pixels of Z-value data simultaneously.

For each input or output (I/O) transaction between one of the buffers 34, 35 and the drawing processor 32', either two pixels of color or Z-value data may be retrieved from or written into the appropriate buffer. Because two pixels of either color or Z-value data are being processed at the same time, the drawing processor 32' has two copies of the color processing hardware C (this is represented in FIG. 2 by the indication 2×C) and two copies of the Z processing hardware Z (represented by 2×Z). For 3-D applications this architecture requires 64 +48=112 data lines. This memory architecture uses 112 data lines, two 3-D color processors, and two 3-D Z-value processors to process two pixels of data (e.g., two pixels of color or two pixels of Z-values) per I/O transaction.

In the 2-D application, two pixels of color data may be retrieved from either the frame buffer 34 or the Z buffer 35 and brought to the 2-D processing unit 44'. Because two pixels are processed at once, the drawing processor 32' requires two copies of the 2-D color processing hardware. Thus, 64 data lines are required to process the 2-D application.

Overall, this memory architecture uses 112+64=176 total data lines to process graphics information. Although this is a very large memory architecture, it processes two pixels of color or Z-value data (e.g., 64 bits) in a single I/O transaction.

FIG. 3 is a block diagram of another type of known computer graphics memory architecture. This architecture comprises a drawing processor 32", a frame buffer 34, a Z buffer 35, and two data paths 48, 50. The drawing processor 32" comprises a 3-D processing unit 42" and a 2-D processing unit 44". The 3-D processing unit has a color processor C and a Z-value processor Z.

As in FIG. 2, this hardware is well-known to those skilled in the art. The frame buffer 34 holds 32 bit pixel color data for a number or pixels. The frame buffer 34 is 32 bits wide and is connected to a 32 bit line path 48. In a 3-D application, the 32 line data path 48 transports the color pixel data to the 3-D processor color processing unit C. The Z buffer 35 holds a number of 24 bit Z-values. The Z buffer is 24 bits wide and is connected to a 24 line data path 50, which path transports the Z-value data to and from the 3-D processor Z-value processor Z.

In this architecture, only one pixel of color or Z-value data is processed per I/O transaction. Therefore, only one copy of the 3-D color and Z-value processing hardware are used. For 3-D processing, there are 32+24=56 total data lines. This memory architecture uses 56 data lines, one 3-D color processor, and one 3-D Z-value processor to process one pixel of 3-D color or one pixel of 3-D Z-value information per I/O transaction. Although this architecture is smaller and less expensive to manufacture than the FIG. 2 architecture, it processes one pixel of color or Z-value data per I/O transaction. Thus, it processes graphic information at half the speed of the FIG. 2 architecture. The 24 bit Z buffer is not used in 2-D applications.

Overall, this memory architecture uses 56+32=88 total data lines to process graphics information.

It is an object of the present invention to provide an improved computer graphics memory architecture which processes graphics information quickly, yet uses hardware in an efficient and economical manner.

SUMMARY OF THE INVENTION

These and other objects of the present invention are achieved by an improved computer graphics memory architecture having a frame buffer and a Z buffer, each having a forward and reverse part, each of which is wide enough to handle two pixels of data. A data path is connected to the buffers so that in a 3-D application, a full pixel of both color and Z-value data is transported along the data path in a single I/O transaction. In a 2-D application, two pixels of data are transported along the data path in a single I/O transaction.

In a preferred embodiment, both the frame and Z buffers are divided into two parts each wide enough to handle one pixel of data. In 3-D applications, a data path is selectively connected to the buffers in a manner so that one pixel of color data and one pixel of Z-value data are simultaneously transported to the drawing processor during each I/O transaction. In this preferred embodiment, a first reversing switch such as a multiplexer circuit, is provided to reverse data that arrives from the buffer in reverse order. A second reversing switch, such as a multiplexer circuit, is provided to return the data to the proper buffer after processing.

In a preferred embodiment for 2-D applications, two pixels of data are transported to the drawing processor each I/O transaction. In this preferred embodiment, a third reversing switch is provided to reverse data that arrives from the buffer in reverse order. A fourth reversing switch is provided to return the data to the proper buffer after processing.

BRIEF DESCRIPTION OF THE DRAWINGS

The present invention is described with reference to the following drawings.

DETAILED DESCRIPTION OF A PREFERRED EMBODIMENT

Figure 4:
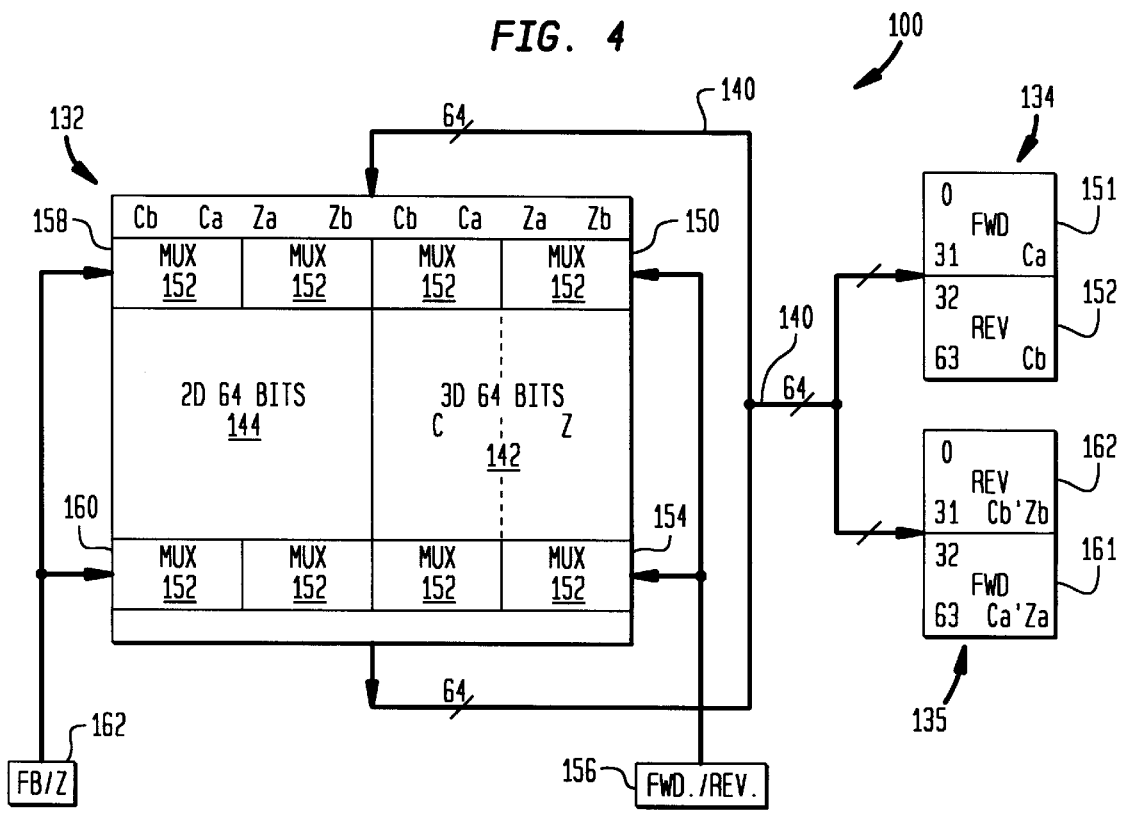
FIG. 4 is a block diagram of a computer graphics memory architecture according to a preferred embodiment of the present invention.

FIG. 4 is a block diagram of a computer graphics memory architecture 100 according to the present invention. This preferred embodiment has a frame buffer 134, a Z buffer 135, a data path 140, and a drawing processor 132. The frame buffer 134 has two parts, a "forward" (even) part 151 and a "reverse" (odd) part 152. The Z buffer also has a "forward" (even) part 161 and a "reverse" (odd) part 162. The drawing processor 132 has a 3-D processor 142 and a 2-D processor 144. The 3-D processor 142 has a first reversing switch, such as a first multiplexer circuit, 150 connected to an input of the 3-D color processor C, and Z-value processor Z. A second reversing switch, such as a second multiplexer circuit, 154 is connected to an output of the color and Z processors. A "forward/reverse" circuit 156 activates the first and second reversing switches or multiplexer circuits 150, 154. The 2-D processor 144 has a third reversing switch, such as a third multiplexer circuit 158 connected to an input of the 2-D processor. A fourth reversing switch, such as a fourth multiplexer circuit, 160 is connected to an output of the 2-D processor. A "frame buffer/Z buffer" circuit 162 activates the third and fourth reversing switches or multiplexer circuits 158, 160.

In 3-D applications, the frame buffer 134 holds pixel color data in a buffer 134 wide enough to connect at least two pixels of data to the data path 140. In a preferred embodiment, the frame buffer is 64 bits wide. The Z buffer holds Z-value data in a buffer 135 wide enough to connect simultaneously at least two pixels of data to the data path 140, and preferably is wide enough to connect two pixels of color data to the data path 140. In a preferred embodiment, the Z buffer is 64 bits wide. Both buffers are connected to a data path 140 which transmits the data to and from the drawing processor 132. In a preferred embodiment, the data path 140 has 64 lines.

The frame buffer forward (even) part 151 holds pixel color data, which data is referred to as Ca, and connects at least one pixel of data to a first set of data path 140 lines. Preferably, the frame buffer forward (even) part 151 connects to data path 140 lines 0–31. The frame buffer second portion 152 holds pixel color data, which data is referred to as Cb, and connects at least one pixel of data to a second set of data path 140 lines. Preferably, the frame buffer reverse (odd) part 161 connects to data path 140 lines 32–63. The Z buffer forward (even) portion 161 holds 3-D Z-value data, referred to as Za, and connects at least one pixel of data to the second set of data path 140 lines. Preferably, the Z buffer forward (even) part 161 connects to data path 140 lines 32–63. The Z buffer reverse (odd) portion 162 holds 3-D Z-value data, referred to as Zb, and connects at least one pixel of data to the first set of data path 140 lines. Preferably, the Z buffer reverse (odd) part 162 connects to data path 140 lines 0–31.

Figure 5:
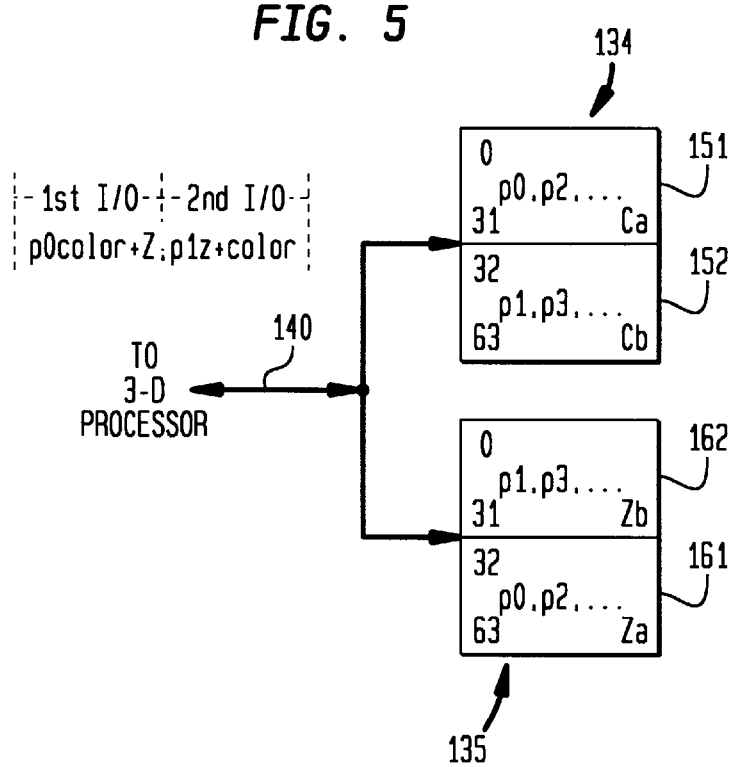
FIG. 5 is a block diagram illustrating the use of the computer graphics memory architecture of FIG. 4 in a 3-D application.

In a preferred embodiment, 3-D data is preferably stored as shown in FIG. 5. A pixel whose color data is stored in the frame buffer forward (even) part 151 (e.g., data path lines 0–31) has its corresponding Z-value data stored in the Z buffer forward (even) part 161 (e.g., data path lines 32–63). In contrast, pixels whose color data is stored in the frame buffer reverse (odd) part 152 (e.g., data path lines 32–64) has its corresponding Z-value data stored in the Z buffer reverse (odd) part (e.g., data path lines 0–31). In this illustrative embodiment, the even numbered pixels (0, 2, . . . ) are stored in the frame and Z buffer forward (even) parts 151, 161 and the odd numbered pixels (1, 3 . . . ) are stored in the frame and Z buffer reverse (odd) parts 152, 162.

In a preferred embodiment, the 3-D data is preferably retrieved from the buffers as follows. During a first I/O transaction, data is retrieved from the frame buffer and Z buffer "forward" parts 151, 161. That is, the frame buffer color bits are connected to data path lines 0–31 and the Z buffer Z-value bits are connected to data path lines 32–63 and transmitted to the 3-D processor 142. Thus, an entire pixel of data—both color and Z-value data—is presented in a single I/O transaction to the 3-D processor 142. This 3-D processor has the color processor C connected to lines 0–31 of the data path 140 and the Z-value processor Z connected to lines 32–63 of the data path. The data is transmitted via the data lines to the proper processors for processing.

During a second I/O transaction, data is retrieved from the frame buffer and Z buffer "reverse" parts 152, 162. That is, data is retrieved from the frame buffer pixel color data bits are connected to data path lines 32–63 and Z buffer pixel Z-value bits are connected to data path lines 0–31. As seen in FIG. 5, these bits are presented to the 3-D processor in reverse order. That is, the color data is on lines connected to the Z-value processor and vice versa. The bits should be reversed into proper order to be delivered to the proper processing unit. The first reversing switch or multiplexer circuit 150, which may comprise one or more multiplexer units 152, reverses the bits and delivers them to the proper processing units. That is, the color data is placed on the proper data path lines to be delivered to the color processor C and the Z-value data is placed on the proper data path lines to be delivered to the Z-value processor. After the bits are processed, they should be reversed again to be stored in the proper buffers. To this end, the second reversing switch or multiplexer circuit 154, which may comprise one or more multiplexer units 152, is provided. The first and second reversing switches 150, 154 are activated by a forward/reverse activation circuit 156, which activates or deactivates the reversing switches 150, 154 according to the order in which the bits are presented to the 3-D processing unit.

This preferred embodiment of memory architecture 100 uses 56 data lines, one 3-D color processor, and one 3-D Z-value processor to process one full 3-D pixel—color and Z-value data—in one I/O transaction. Thus, the inventive architecture uses the same amount of hardware as FIG. 3 architecture for 3-D processing, yet processes data at an equivalent rate as the FIG. 2 architecture (e.g., in two I/O cycles, both the FIG. 2 and inventive architecture process two complete 3-D pixels).

Figure 6:
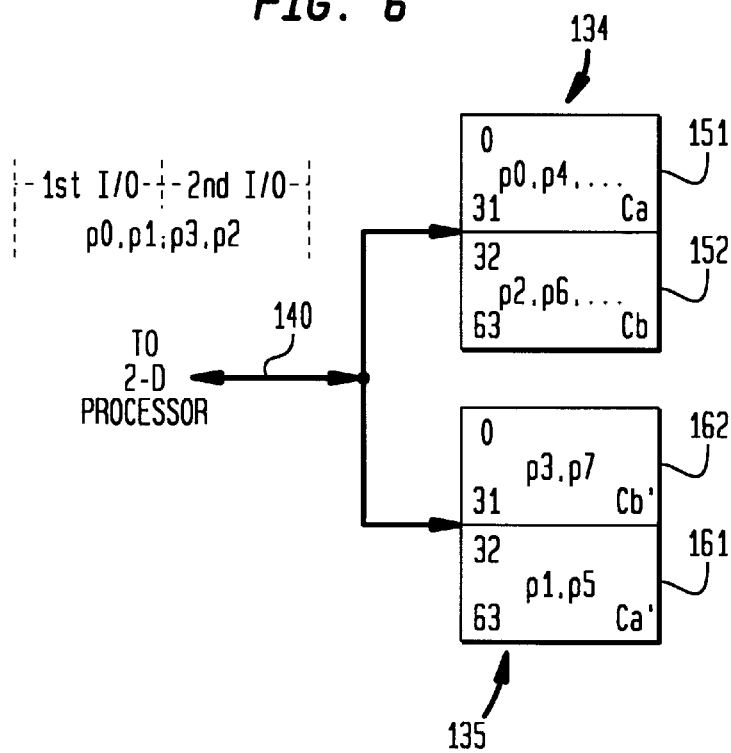
FIG. 6 is a block diagram illustrating the use of the computer graphics memory architecture of FIG. 4 in a 2-D application.

In a preferred embodiment, the 2-D pixel data is preferably stored as shown in FIG. 6. The frame buffer forward part 151 stores, for example, pixels 0, 4, 8, etc. This data is referred to as Ca. The Z buffer "forward" part 161, acting as an additional frame buffer, stores, for example, pixels 1, 5, 9, etc. This data is referred to as Ca'. The frame buffer "reverse" part 152 stores, for example, pixels 2, 6, 10, etc. This data is referred to as Cb. The Z buffer "reverse" part 162 stores, for example, pixels 3, 7, 11, etc. This data is referred to as Cb'.

In a 2-D application, the data is preferably retrieved as follows. During a first I/O transaction, pixel 0 is connected to data path lines 0–31 and pixel 1 is connected to data path lines 32–63. These pixels are presented to the 2-D processor 144 in the proper order and are processed and stored back in the buffers in the usual manner. During a second I/O transaction, pixel 3 is connected to data path lines 0–31 and pixel 2 is connected to data path lines 32–63. As seen in FIG. 6, these pixels are presented to the 2-D processor 144 in reverse order. To be properly processed, a third reversing switch or multiplexer circuit 158, which may comprise one or more multiplexer units 152, is provided. When the reversed pixels are presented to the 2-D processor 144, the third reversing switch or multiplexer circuit 158 reverses the pixels so that they are processed in the proper order. After these pixels are processed, they should be reversed again to be stored in the proper buffers. To this end, a fourth reversing switch or multiplexer circuit 160, which may comprise one or more multiplexer units 152, reverses the pixels so that they are stored back in the buffer from which they were retrieved. The third and fourth reversing switches 158, 160 are enabled by a frame buffer/Z buffer enable circuit 162.

This preferred embodiment of the memory architecture 100 uses 64 data lines and two 2-D processors to process two 2-D pixels in one I/O transaction. The hardware requirements and processing speed are the same as the FIG. 2 architecture.

Figure 1:
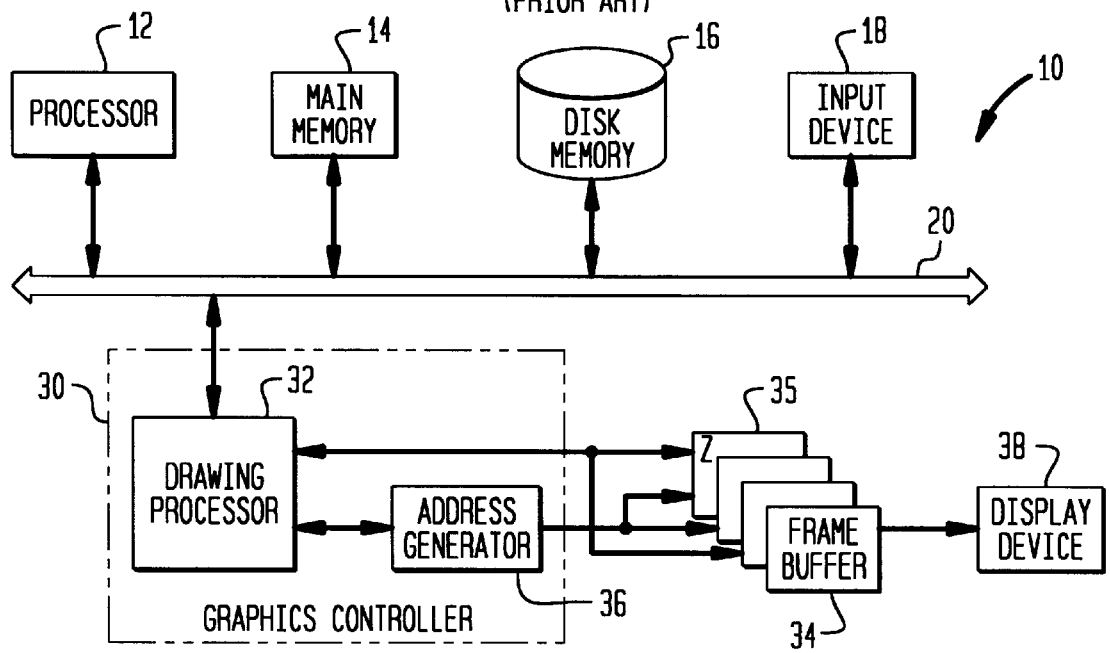
FIG. 1 is a block diagram of a conventional computer system.
Figure 2:
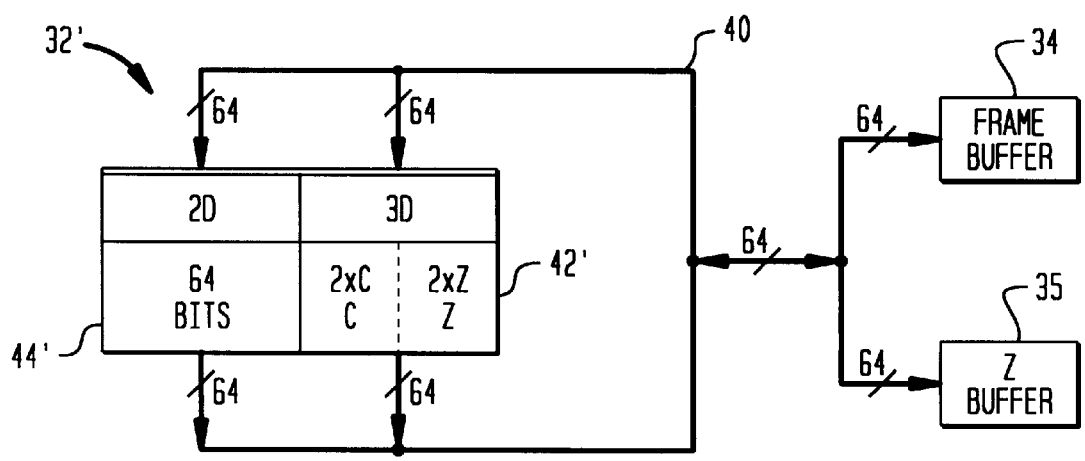
FIG. 2 is a block diagram of a first prior art computer graphics memory architecture.
Figure 3:
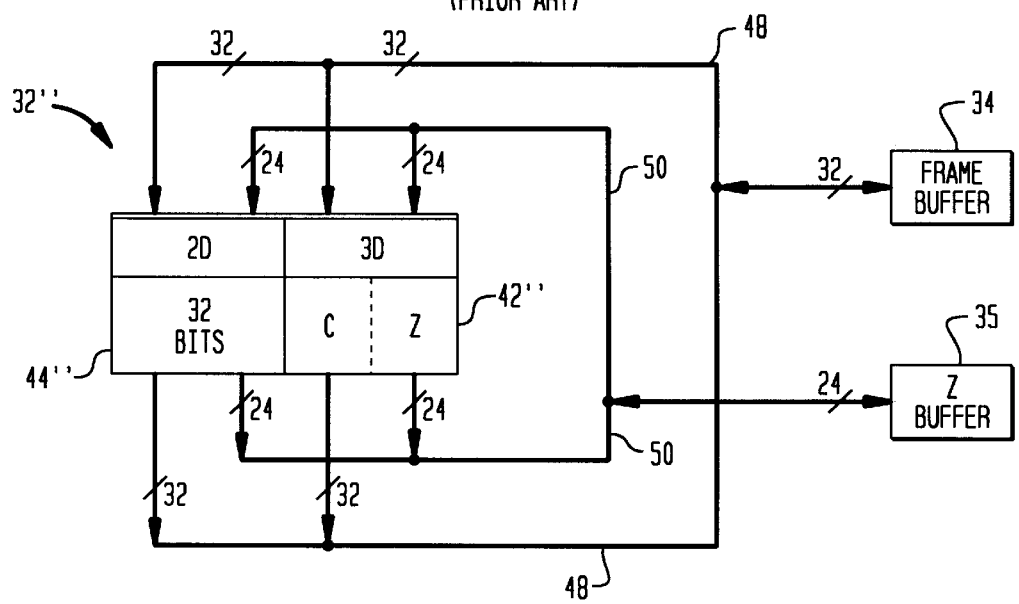
FIG. 3 is a block diagram of a second prior art computer graphics memory architecture.

In this preferred embodiment, either two 2-D pixels or one complete 3-D pixel—both color and Z-value—are processed in a single I/O transaction. Two copies of 2-D processing hardware are preferably provided, but only one copy of the 3-D color and Z-value processing hardware is preferably provided. The 2-D application uses 64 data lines; the 3-D application uses a total of 32+24=56 data lines. For the preferred embodiment of the present invention, a total of 64+56=120 lines are used. A table comparing the number of data lines used by the prior art architecture and a preferred embodiment of the present invention is set out below:

|  | FIG. 2 | FIG. 3 | Present Invention |
|---|---|---|---|
| Lines used in 2-D | 64 | 32 | 64 |
| Lines used in 3-D | 64 + 48 = 112 | 32 + 24 = 56 | 32 + 24 = 56 |
| Total Lines | 176 | 88 | 120 |

A table comparing the processing speeds of the prior art architectures and the present invention are set out below:

|  | FIG. 2 | FIG. 3 | Present Invention |
|---|---|---|---|
| 2-D processing speed | 2 pixels per I/O | 1 pixel per I/O | 2 pixels per I/O |
| 3-D processing speed | 2 color or 2 Z-values per I/O | 1 color or 1 Z-value per I/O | 1 pixel color and Z-value per I/O |

Thus, the processing speed of the present invention is equivalent to the speed of the architecture shown in FIG. 2. Both process 64 bits in one I/O transaction. However, this equivalent speed is performed by the present invention with much less hardware, and therefore is smaller and less expensive to implement. For 3-D applications, the present invention processes at twice the speed as the architecture shown in FIG. 3 and has the same amount of hardware.

The present invention is not limited to the disclosed embodiment, but rather various modifications, substitutions, structures, and methods made be used to without departing from the scope of the present invention. For example, specific numbers of bits and data lines are used to describe an illustrative embodiment. A person skilled in the art readily recognizes that the invention may be used with different bit and line numbers, according to the needs of an application.

We claim:

1. A computer graphics memory architecture having a drawing processor, a frame buffer, and a Z buffer, the architecture comprising:
   a. a data path connected to the drawing processor, the data path being selectively connected to the frame buffer and the Z buffer, the data path having a plurality of data lines;
   b. the frame buffer having a first and a second part, both parts being sufficiently wide to output a pixel of color data; the frame buffer first part being connected to a first set of data path data lines and the frame buffer second part being connected to a second set of data path data lines; and
   c. the Z buffer having a first and a second part, both parts being sufficiently wide to output at least a pixel of Z-value data and the Z buffer first part being connected to a fourth set of data path data lines, and the Z buffer second part being connected to a third set of data path data lines;

wherein the architecture is configured to selectively connect the frame buffer first part and the Z buffer first part during a first transaction, and to selectively connect the frame buffer second part and the Z buffer second part during a second transaction.

2. The architecture of claim 1, wherein the data path comprises 64 data lines, and the frame buffer and Z buffer are both 64 bits wide.

3. The architecture of claim 2, wherein the frame buffer first part is selectively connected to data path lines 0 through 31, the frame buffer second part is selectively connected to data path lines 32 through 63, the Z buffer second part being selectively connected to data path lines 0 through 31, and the Z buffer first part being selectively connected to data path lines 32 through 63.

4. The architecture of claim 3, wherein the drawing processor further comprises a color processor and a Z-value processor, the color processor being connected to data path data lines 0 through 31 and the Z-value processor being connected to data path data lines 32 through 63.

5. The architecture of claim 4, wherein the drawing processor further comprises a first reversing switch between the data path and an input of the drawing processor for reversing data from the frame buffer second part and Z the buffer second part.

6. The architecture of claim 4, wherein the drawing processor further comprises a second reversing switch between an output of the drawing processor and the data path for reversing data from the drawing processor to be stored in the frame buffer second part and the Z buffer second part.

7. The architecture of claim 1, wherein the drawing processor further comprises a first reversing switch between the data path and an input of the drawing processor for reversing data from the frame buffer second part and the Z buffer second part.

8. The architecture of claim 7, further comprising a forward/reverse circuit configured to selectively enable the first reversing switch.

9. The architecture of claim 1, wherein the drawing processor further comprises a second reversing switch between an output of the drawing processor and the data path for reversing data from the drawing processor to be stored in the frame buffer second part and the Z buffer second part.

10. The architecture of claim 9, further comprising a forward/reverse circuit configured to selectively enable the second reversing switch.

11. The architecture of claim 1, wherein the drawing processor further comprises a first and a second two 2 dimensional (2-D) graphics processor, the first 2-D processor selectively connected to data path data lines 0 through 31, and the second 2-D processor connected to data path data lines 32 through 63.

12. The architecture of claim 11, wherein the frame buffer first part is selectively connected to data path lines 0 through 31, the frame buffer second part is selectively connected to data path lines 32 through 63, the Z buffer second part is selectively connected to data path lines 0 through 31, and the Z buffer first part is selectively connected to data path lines 32 through 63.

13. The architecture of claim 12, wherein the drawing processor further comprises a third reversing switch between the data path and an input of the drawing processor for reversing data from the frame buffer second part and the Z buffer second part.

14. The architecture of claim 13, further comprising a frame buffer/Z buffer circuit configured to selectively enable the third reversing switch.

15. The architecture of claim 12, wherein the drawing processor further comprises a fourth reversing switch between an output of the drawing processor and the data path for reversing data from the drawing processor to be stored in the frame buffer second part and the Z buffer second part.

16. The architecture of claim 15, further comprising a frame buffer/Z buffer circuit configured to selectively enable the fourth reversing switch.

17. A method for processing computer graphics data in a computer having a drawing processor, a frame buffer, a Z buffer, and a data path selectively connecting the frame and Z buffers to the drawing processor, the method comprising the steps of:
   a. transporting simultaneously from the frame buffer and the Z buffer to the drawing processor a pixel of color data and a pixel of Z-value data by reversing an order in which the color and Z-value data are transported from the frame buffer and Z buffer; and
   b. processing simultaneously the transported color and Z-value data.

18. A method for processing computer graphics data in a computer having a drawing processor, a frame buffer, a Z buffer, and a data path selectively connecting the frame and Z buffers to the drawing processor, the method comprising the steps of:
   c. dividing the frame buffer into a first and a second part, and dividing the Z buffer into a first and a second part;
   d. selectively connecting to the data path one of either the frame buffer and Z-buffer first parts and the frame buffer and Z-buffer second parts;
   e. transporting simultaneously from the frame buffer and the Z buffer to the drawing processor a pixel of color data and a pixel of Z-value data; and
   f. processing simultaneously the transported color and Z-value data.

19. The method of claim 18, further comprising the steps of:
   a. storing color data of even numbered pixels in the frame buffer first part;
   b. storing color data of odd numbered pixels in the frame buffer second part;
   c. storing Z-value data of even numbered pixels in the Z buffer first part; and
   d. storing Z-value data of odd numbered pixels in the Z buffer second part.

20. The method claim 19, wherein the step of transporting further comprises the step of reversing the color and Z-value data transported from the frame and Z-buffer second parts.

* * * * *